United States Patent Office 3,076,630
Patented Feb. 5, 1963

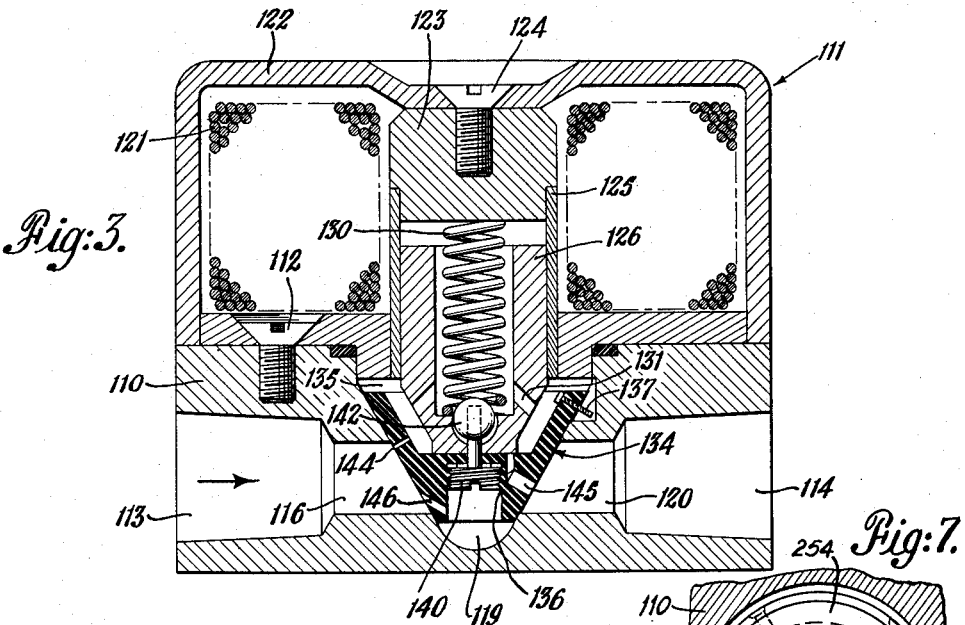
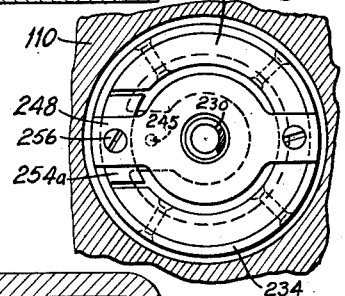
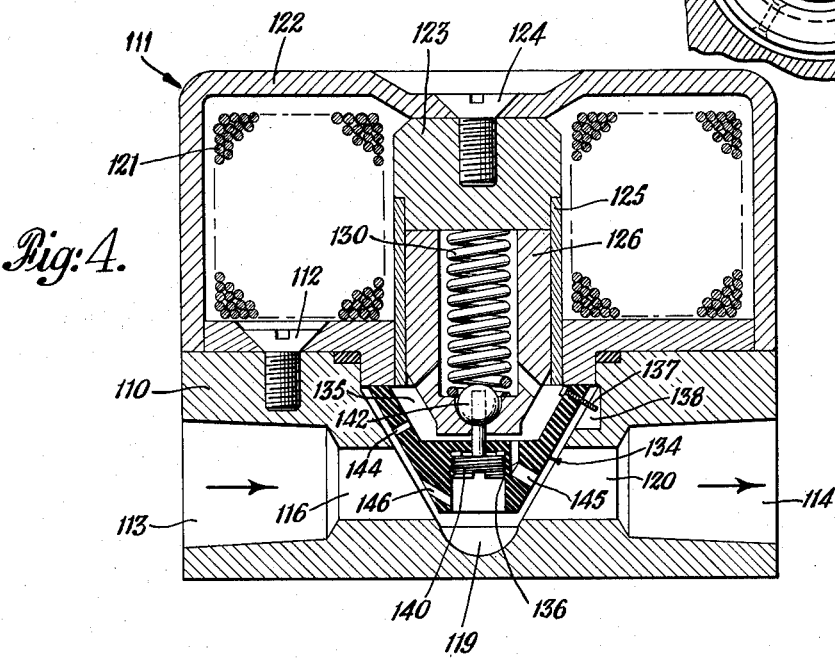

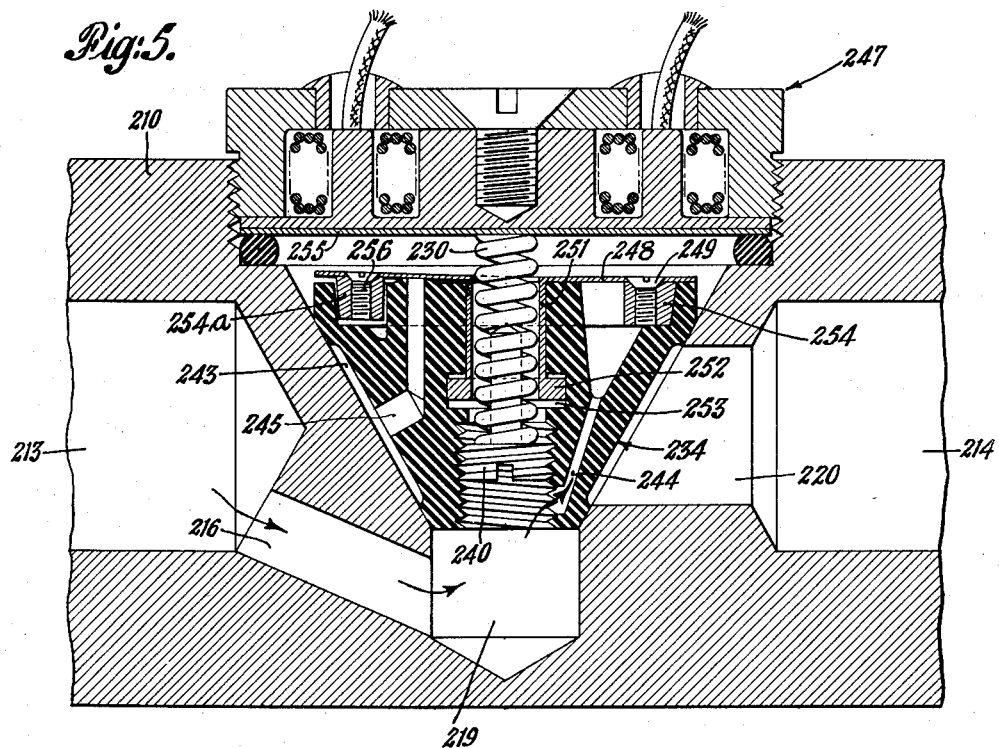
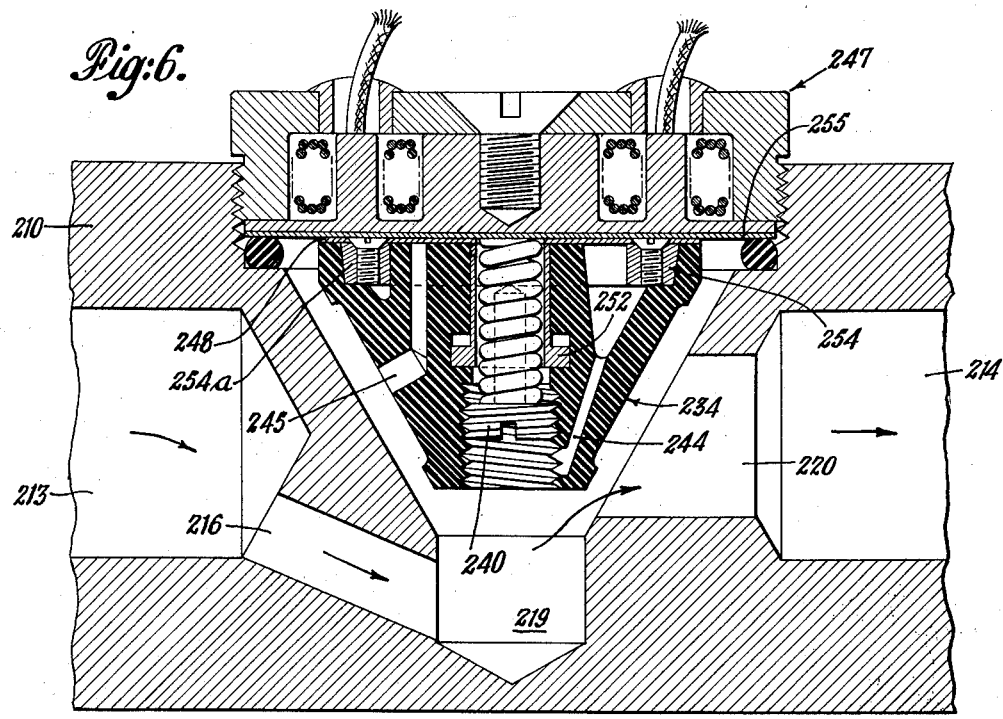

3,076,630
PILOT OPERATED VALVE
John S. Hammond, 34 Lincoln Road, Greenwich, Conn.
Filed Apr. 6, 1959, Ser. No. 804,407
2 Claims. (Cl. 251—30)

This invention relates to automatically operated valves for controlling the flow of fluid in a pipe line and more particularly to valves of the so-called pilot pressure type.

As is well known, automatically operated valves may be classified into direct action and pilot action types. In the former, the valve plug is lifted off the valve seat, to open the valve, by the direct action of the automatic operator (e.g., a solenoid) when activated, if the valve is of the normally closed type, or by the direct action of a spring when the operator is deactivated, if the valve is of the normally open type. On the other hand, a pilot operated valve, as the name implies, is provided with an auxiliary pilot valve for effecting a differential in pressure around the valve plug tending to unseat it and open the valve.

Pilot operated valves may be of the piston type, wherein the valve plug takes the form of an assembly comprising a piston having a pilot passageway and an insert suitable for seating on a valve seat ring. The piston is slidably disposed in a cylindrically shaped portion of the valve body, and is thereby guided into and out of contact with the valve seat. A clearance area is provided between the piston and the walls of the cylindrical portion of the valve body in order to permit some of the medium from the inlet side of the valve to fill a chamber above the piston; the clearance area is, however, made smaller than the area of the pilot passageway which connects the chamber above the piston to the outlet side of the valve. Therefore, whenever the pilot passageway is open and there is flow therethrough, the pressure in the chamber above the piston will be lower than the pressure in the outlet side of the valve below the piston.

When the valve is closed, and the automatic operator is employed to open the pilot valve, the chamber above the piston will empty through the pilot passageway faster than it fills through the clearance area between the piston and the valve body, thus causing the pressure above the piston to drop below the outlet pressure under the piston, resulting in the piston valve plug being lifted off the valve seat to open the valve. The valve will remain open as long as the automatic operator remains activated. When the operator is deactivated, the piston moves toward the valve seat under the influence of a weight or spring. Furthermore, since the pilot valve is closed as the valve starts to close, inlet pressure builds up above the piston, whereas outlet pressure is applied to the under surface thereof, resulting in a pressure differential which aids the spring or weight to close the valve. The spring or weight forces the piston against the valve seat to keep the valve closed until the operator is reactivated to compress the spring and open the pilot valve.

Pilot piston valves as described above have been made without significant change for many years although serious problems have arisen in connection with their use. For example, piston valve plugs have a tendency to stick or cock in the cylindrically shaped portion of the valve body, and where means for guiding the piston are provided in order to alleviate this problem, increased frictional resistance is offered to the operation of the piston, thus increasing the power requirements of the automatic operator. It has been attempted to solve some of these problems by replacing the piston with a diaphragm, but under such condition, the operating pressures of the valve must be reduced. Furthermore, both piston and diaphragm valves have been made large in relation to the function which they perform; the height of the former and the width of the latter tending to be excessive, and neither is capable of utilizing, to the greatest extent, the pressures of the medium in the line to aid the automatic operator in opening and closing the valve.

It is the object of the present invention to overcome these and other difficulties providing a valve which is not only physically smaller than equivalent conventional pilot pressure valves, but which requires less power to operate as well. Toward these ends, the present invention employs a conically shaped valve plug rather than the cylindrically shaped piston mentioned above. Also, the conical shape permits greater utilization of the medium pressure in closing the valve because the top of the cone plug valve presents a larger area for inlet pressure to apply upon the bottom area which is over the main valve port, thereby reducing the work load of the operator.

The cone shape offers less resistance to flow through the valve thereby reducing the pressure drop of the medium as it flows through the valve. In addition, a conically shaped valve can be made double seated to effect, with elastic like materials, a tight seat, the seat becoming tighter at higher pressures because seating pressure is in direct relation to the inlet media pressure. Here again the work load of the operator is reduced. The conical plug valve is self centering in its conical valve seat and will seat and unseat with minimum friction because the side walls of the conical plug valve move on to and off the side walls of the conical seat with a minimum of rubbing thereon. It may be seen, therefore, that by providing a conically shaped plug and seat, a pilot pressure valve may be made more efficient to handle greater flows, at higher pressures, while producing lower pressure drops than comparable conventional valves.

The invention will now be more fully described with reference to the accompanying drawings which illustrate both a solenoid and a magnetic operator. Mechanical operators responsive to temperature, pressure, flow and liquid level can also be used.

In the drawings:

FIG. 3 is a cross-sectional view of an alternative embodiment of the present valve shown in closed position;

FIG. 4 is similar to FIG. 3 showing the valve in open position;

FIG. 5 is a cross-sectional view of another alternative embodiment of the present valve shown in closed position;

FIG. 6 is similar to FIG. 5 showing the valve open; and

FIG. 7 is a top plan view of the plug of FIG. 5, particularly showing the armature arrangement.

Figure 1:
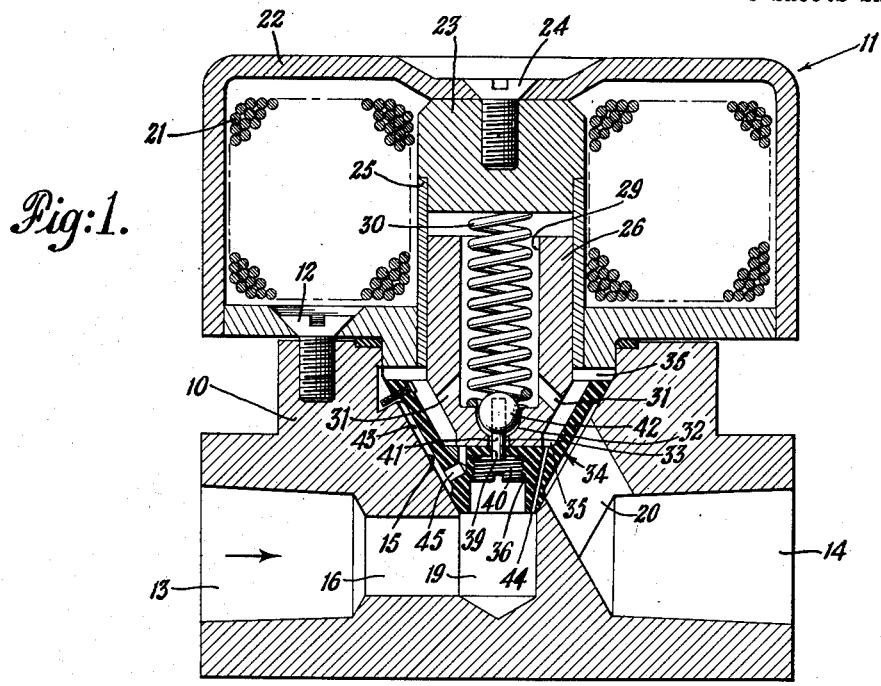
FIG. 1 is a cross-sectional view showing the present valve in closed position.
Figure 2:
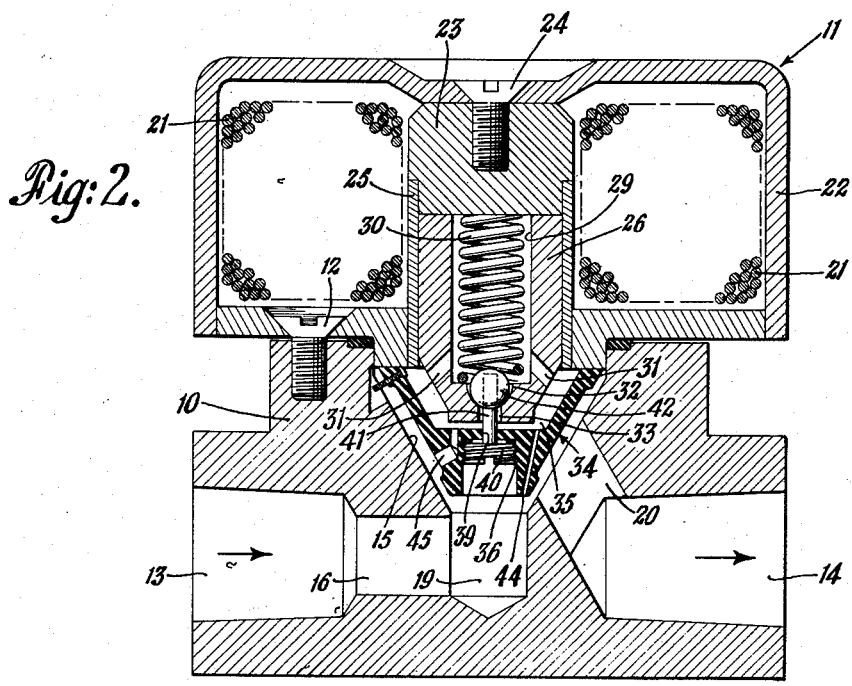
FIG. 2 is similar to FIG. 1 showing the valve in open position.

Referring to FIGS. 1 and 2, a pilot operated solenoid valve of the present invention is shown having, generally, a valve body 10 and a solenoid 11 mounted on the valve body by the fastening means 12. The valve body 10 is provided with an inlet port 13, an outlet port 14, and a valve seat therebetween. An inlet passageway 16 connects the inlet port 13 to a chamber 19 disposed below the valve seat 15, and an outlet passageway 20 leads from the sidewall of the valve seat to the outlet port 14.

The coil 21 of the solenoid 11 is enclosed in a casing 22 which is preferably made of ferrous metal so that a complete metallic magnetic circuit is furnished around the coil 21, since as is well known, the resistance to the passage of magnetic lines of force is a good deal less in metal than in air. It follows, therefore, that by using a ferrous metallic casing, a stronger magnetic field may be established to operate the valve with the same amount of power supplied to the coil 21, than if other than a ferrous metallic casing were used.

A block 23, having a reduced lower end, is held fast inside the top of the casing 22 at the center thereof by the screw 24. A tubular member 25, also held fast within the casing 22, fits tightly about the lower end of the block 23, and an armature plunger 26 is slidably disposed within the tubular member 25. The plunger 26 should, of course, be ferrous metallic so that it will slidably respond to energization of the coil 21. The plunger 26 is partially hollowed out to form a well 29 therein, which well serves to accommodate a compression spring 30 disposed between the block 23 and the floor of the well 29. A number of ports 31 are provided in the plunger 26 to allow the fluid in the line to flow into the well 29 and the space between the top of the plunger 26 and the bottom of the block 23 (in FIG. 1). Below the floor of the well 29, the plunger 26 is provided with an enlarged socket 32 having an opening 33 at its lower end to the bottom of the plunger. By means of this enlarged socket, the valve plug 34 is loosely connected to the plunger 26.

As mentioned before, the valve plug and valve seat of the present invention are preferably of conical shape, but it should be pointed out that any valve plug and seat will suffice if so shaped that the area of one end thereof exceeds the area of the other end, and the sides thereof tend to taper between those ends, such as for example, a pyramid shape.

The valve plug 34 is hollowed out near its larger end thereby forming, together with the space between the valve plug and the lower portion of the casing 22 (in FIG. 1), a chamber 35, in and above the upper portion of the valve seat 15. A threaded hole 36, disposed in the smaller end of the plug 34, terminates in an aperture 39 which is coaxial with the opening 33 in the plunger 26. A plug 40 is threaded into the hole 36, and a pin 41 integral with the plug 40 passes through the aperture 39 and the opening 33 into the socket 32 wherein a ball 42 is threaded on its upper end. The ball 42 is so sized that when the valve is closed (FIG. 1) a spacing exists between the walls of the enlarged socket 32 and the lower hemisphere thereof. The exterior walls of the valve plug 34 are undercut for most of their length in order to form an annular area 43 between the valve plug and the valve seat when the valve is closed. The purpose of this annular area will be described hereinafter. The valve plug 34 is also provided with an inlet passageway 44 to permit the fluid in the line to flow into the chamber 35 and the well 29 when the valve is closed, and an outlet pilot passageway 45 connects the chamber 35 to the outlet passageway 20 through the annular area 43. Notice that the area of the outlet pilot passageway 45 exceeds that of the inlet passageway 44, the reason for which will be mentioned hereinafter.

As shown in FIG. 1, when the present valve is in closed position, the two lips of the valve plug 34, bordering the annular area 43, engage the valve seat 15, and the lower end of the plunger 26 closes off the outlet pilot passageway 45, under the influence of the spring 30, thus preventing the flow of fluid through the pilot valve passageway and the main valve. When the valve is to be opened, the solenoid 11 is energized thereby raising the plunger 26 against the force of the spring 30. The initial movement of the plunger 26 will not directly cause the lifting of the valve plug 34 off the valve seat 15, due to the loose fit of the ball 42 in the enlarged socket 32, but the initial movement of the plunger does serve to open the pilot passageway 45. Thereupon, due to the aforementioned difference in areas between the inlet leak hole 44 and the pilot passageway 45, fluid will leave the chamber 35 faster than it enters, with the result that the pressure of the fluid above the valve plug falls far enough below the pressure of the fluid under the plug to permit the fluid force on the underside of the plug to exceed that on the upper side, which force imbalance serves to unseat the plug or "crack" the valve and open it. A major advantage of the present valve is that the above described force imbalance around the valve plug is not the only agent serving to "crack" the valve and open it.

As mentioned before, the fluid empties out of the chamber 35 through the pilot passageway 45 into the annular area 43 (FIGS. 1 and 2) before flowing to the outlet passageway 20. Therefore, this fluid which flows through the annular area from the pilot passageway to the outlet passageway exerts a pressure on the outside walls of the valve plug and the inside walls of the seat 15, which pressure produces a force additive to the force imbalance mentioned above. It is a combination of forces applied simultaneously then, which serve to "crack" and open the present valve. Thereafter, for as long as the solenoid 11 remains energized, the plunger 26 will hold the valve plug of the valve seat in open position, as in FIG. 2.

As mentioned before, the valve plug 34 and valve seat 15 of the present valve are conically shaped. Such configuration enables the present valve to employ the fluid pressure in the line to great advantage, to do the major work and to help close the valve and keep it closed. For example, when the valve is closed, the pressure of the fluid on both ends of the valve plug 34 is equal, however, due to the large difference in area between the two ends of the plug, the net fluid force on the plug will operate on the upper and larger area end thereof and on the inner walls of the hollowed-out portion 35, and hence tend to press the valve plug into the valve seat, thus aiding the spring 30 in keeping the valve closed. Also, when the coil 21 has been de-energized, and the valve plug 34 nears the valve seat under the influence of the spring 30, fluid inlet pressure is being applied to the two ends of the valve plug, but fluid outlet pressure is being applied to the outside walls of the plug where the walls have been undercut and area 43 is open to the outlet 20, hence a force imbalance helping to seat the plug and close the valve results.

A further advantage presents itself due to the shape of the present valve. As was mentioned before, the valve plug 34 is partially hollowed-out near its larger end and its smaller end, hence these ends tend to be highly flexible, especially if the plug is fabricated from a substance such as nylon. Therefore, when the plug engages the valve seat under pressure, the plug will be flexible enough to conform readily to the shape of the valve seat, thus forming a tight seal, even though the valve seat has not been machined too accurately or highly finished. Furthermore, when the pressure above the valve plug decreases, after the pilot valve opens, the distorted valve plug tends to spring back to its normal shape and thus pop off the valve seat, thereby aiding to break the seal between the plug and seat.

Due to the conical shape of the present valve plug and valve seat, the valve body 10 may be reduced in size over comparable pilot operated valves since, as may readily be seen, the valve plug 34 need be lifted off the valve seat 15 only a short distance in order to open a large flow area through the valve. Furthermore, the annular area 43 increases this effect by adding measurably to the flow area offered through the valve. It should here be mentioned that the annular area 43 will serve its purpose equally as well if formed in the valve seat rather than in the valve plug, however, it is preferably formed in the valve plug for manufacturing purposes.

FIGURES 3 and 4 show an alternative embodiment of the present invention, which embodiment is preferably used with lower pressure flow than that with which the previous embodiment is employed. It is preferred that a material such as soft rubber be used to fabricate the valve plug 134. Furthermore, in order to insure that the valve plug 134 does not rotate about its axis and permit the pilot passageway 145 to empty directly into the inlet passageway 116, the valve plug is provided with a screw 137 which travels in a vertical slot 138 in the valve body 110, thus allowing the plug to move up and down but not to rotate. This form of valve is almost identical with the one just described with the following exceptions: the inlet passageway 116 and the outlet passageway 120 are aligned in order to reduce the pressure drop through the valve; no annular area 43 is provided between valve plug 134 and the valve seat, since provision of an annular area would prevent the valve from being closed due to the aligned passageways 116 and 120; and the valve plug 134 is provided with a leak hole 146 for filling the chamber 119, as well as a leak hole 144 for filling the chamber 135. The advantages which were mentioned above with respect to the valve of FIGS. 1 and 2 apply to this embodiment, i.e., the pressure of the fluid in the line substantially aids in closing the valve and keeping it closed, as well as in opening the valve, thereby permitting the solenoid 111 and the spring 130 to be reduced in both physical size and force, and due to the conical shape of the valve plug and valve seat, the physical size of the valve body 110 may be reduced since only a short movement of the valve plug is needed to open the valve fully. For these reasons the total size of the valve, and the power requirements of the valve, may be reduced over comparable pilot operated valves. Furthermore, a tight seal may be obtained without extremely accurately machining of the valve plug and seat, due to the flexibility of the partially hollowed-out valve plug.

A third embodiment of the present invention, shown in FIGS. 5 and 6, indicates a preferred construction of the valve when an electro-magnet 247 is employed to operate it rather than a solenoid. In this embodiment, the valve plug 234 is provided with a thin, spring-like metallic cover and lever strip 248 which is fastened at one end to an armature ring 254 by the screw 249. The major portion of the armature ring 254 is fast to the valve plug 234. However, a small section thereof, 254a, is split off from the armature and fits loosely in the valve plug. The free end of the lever cover strip 248 is fastened to the loose section 254a of the armature by the screw 256, and at a point intermediate the end of the lever 248, it closes off the pilot passageway 245 disposed in the valve plug. At its center, the strip 248 has fastened to it a tubular member 251 having a flange 252 at its lower end loosely disposed in an enlarged slot 253 in the valve plug. When the present valve is in closed position fluid at inlet pressure flows through passageway 244 to the upper part of plug 234 thereby assisting spring 230 in maintaining the valve closed. When the valve is to be opened, the electro-magnet 247 is energized thereby attracting the strip 248 plus the section 254a of the armature 254, causing the free end of the strip 248 to move toward the magnet 247 whereby the strip is flexed. This movement, of course, opens the pilot passageway, and as described above, the resulting pressure imbalance and the pressure of the fluid flowing through the annular area 243 "cracks" and opens the valve against the force of the spring 230. In addition to the force of the fluid, there are three additional forces tending to open the valve, namely; the force of the magnet on the major portion of the armature 254; the force established by the tendency of the magnetic field in the armature 254 to seek a complete magnetic circuit and hence pull the armature 254 into alignment with the section 254a which has already been raised; and the force caused by the tendency of the spring-like strip 248, whose free end is touching the lowermost surface of the magnet 247, to straighten out by pivoting about its point of contact with the magnet 247 thereby serving to lever-up the valve plug. Once the plug rises and the entire armature 254 contacts the electro-magnet 247, the latter is powerful enough to hold the valve in open position. When the magnet 247 is de-energized, the spring 230 with the aid of the fluid in the line when opening the pilot valve. A beryllium copper disc shading coil 255 is employed on the undersurface of the electro-magnet 247 to prevent residual magnetism from holding up the valve plug when the magnet is de-energized.

Comparing the embodiment of FIGS. 5 and 6 with the embodiment of FIGS. 1–4, it will be noticed that the solenoid plunger 26 or 126 (FIGS. 1–4) acts directly against the pressure in the line when opening the pilot valve, whereas when the lever strip 248 (FIGS. 5 and 6) is actuated to open the pilot valve, the force employed to actuate it is applied mainly to its free end (i.e., the end farthest from the fulcrum of the lever, which fulcrum is at the screw 249) since the armature section 254a is fastened at the free end, and the resultant force of the pressure in the line is applied to the lever at some intermediate point between its free end and its fulcrum, hence the actuating force of the lever may be reduced over the force needed to actuate the direct acting plunger. Therefore, employment of a lever type pilot valve affords an opportunity for more efficient operation of a pilot operated valve than would be possible by using a direct acting pilot valve. Furthermore, the incorporation of a lever type pilot valve, besides reducing the power required to operate the valve, makes possible a reduction in height in the entire valve over the valves which include a direct acting pilot valve.

Notice also that the member 248 of FIGS. 5 and 6 is, in one piece, a spring, a lever, and a pilot valve plug, making possible extremely compact valve construction.

It should be pointed out finally, that the conical shape of the present flexible nylon or soft rubber valve plug and valve seat, makes the plug inherently self-centering, hence always assuring a tight seal between plug and seat. Such a valve plug introduced, when closing, at an angle, and not straight on to the valve seat, will be subject to minimum wear due to pounding of the valve plug and seat as is the case with conventional valves.

The invention has been shown and described in preferred form only and by way of example, and many variations and modifications may be made therein and in its mode of application which will still be comprised within its spirit. It is understood, therefore, that the invention is not limited to any specific form or embodiment, except insofar as such limitations are specified in the appended claims.

What is claimed is:

1. A valve of the balanced pressure type comprising a body portion having an inlet port and an outlet port, a conical frustum shaped valve seat disposed therebetween having a first chamber adjacent its larger diameter end and a second chamber adjacent its smaller diameter end, inlet passageways connecting the inlet port to the first and second chambers, and an outlet passageway leading from the side wall of said valve seat to the outlet port, a conically shaped valve plug disposed on said valve seat when the valve is closed, a pilot passageway disposed in said valve plug connecting the first chamber to the outlet passageway when the valve is closed, a resilient member mounted on said valve plug normally prohibiting fluid flow through the pilot passageway, said resilient member being mounted at one end only on said valve plug and electro-magnetic means adapted when energized to flex said resilient member so as to initially lift the free end only of said member, whereby said member will act as a lever with respect to the resultant of the fluid force thereon and permit fluid flow through the pilot passageway.

2. A valve in accordance with claim 1 including an armature, said armature being split into a larger portion and a smaller portion, said larger portion being fast to said valve plug, said resilient member being fastened at one end to said larger portion of said armature and fastened at its other end to said smaller portion of said armature, and wherein said electro-magnetic means when energized serves to attract said smaller armature portion and the end of said member attached thereto, thereby flexing said member and opening said pilot passageway.

References Cited in the file of this patent

UNITED STATES PATENTS

| | | |
|---|---|---|
| 570,727 | Gale | Nov. 3, 1896 |
| 858,063 | Delany | June 25, 1907 |
| 1,035,898 | Pasman | Aug. 20, 1912 |
| 2,291,101 | Papulski | July 28, 1942 |
| 2,301,581 | Ray | Nov. 10, 1942 |
| 2,573,369 | Snoddy | Oct. 30, 1951 |
| 2,588,242 | Hunter | Mar. 4, 1952 |
| 2,623,542 | Obermaier | Dec. 30, 1952 |
| 2,673,706 | Matteson | Mar. 30, 1954 |
| 2,755,058 | Margrave | July 17, 1956 |
| 2,795,391 | Krone | June 11, 1957 |

FOREIGN PATENTS

| | | |
|---|---|---|
| 5,445 | Great Britain | of 1880 |